United States Patent [19]

Hughes

[11] 4,081,940
[45] Apr. 4, 1978

[54] SYSTEM AND APPARATUS FOR INTERCONNECTING STRUCTURAL MEMBERS, AND METHOD OF UTILIZING SAME

[75] Inventor: Robert S. Hughes, Southfield, Mich.

[73] Assignee: Erecto-Pat Company, Oxford, Mich.

[21] Appl. No.: 621,789

[22] Filed: Oct. 14, 1975

Related U.S. Application Data

[63] Continuation of Ser. No. 372,698, Jun. 22, 1973, Pat. No. 3,921,356.

[51] Int. Cl.² ............... E04C 3/30; E04C 5/18
[52] U.S. Cl. ................................ 52/712; 52/721
[58] Field of Search .......... 52/301, 299, 517, 101, 52/263, 92, 297, 753 D, 712–715, 721; 108/92, 111, 132; 248/357, 188; 297/445–451; 403/401, 402

[56] References Cited

U.S. PATENT DOCUMENTS

| 880,243 | 2/1908 | Rominger | 52/301 |
| 1,222,457 | 4/1917 | Peer | 108/132 |
| 1,639,601 | 8/1927 | Gardiner | 52/517 |
| 1,721,601 | 7/1929 | McClure | 297/446 |
| 1,730,618 | 10/1929 | Mayo | 248/357 |
| 1,796,536 | 3/1931 | Roos | 248/357 |
| 1,818,418 | 8/1931 | Millard | 52/263 |
| 1,988,388 | 1/1935 | Mioton | 52/92 |
| 2,235,811 | 3/1941 | Davison | 52/299 |
| 2,668,089 | 2/1954 | Cowan | 108/132 |
| 3,203,660 | 8/1965 | Bowden | 248/357 |
| 3,436,888 | 5/1969 | Ottosson | 52/391 |
| 3,611,736 | 10/1971 | Goodman | 52/517 |

FOREIGN PATENT DOCUMENTS

| 77,696 | 2/1962 | France | 52/632 |
| 637,281 | 1/1928 | France | 244/119 |
| 120,691 | 8/1926 | Switzerland | 297/157 |

Primary Examiner—James L. Ridgill, Jr.
Attorney, Agent, or Firm—Irving M. Weiner; Pamela S. Austin

[57] ABSTRACT

A system and method for erecting a structure elevated off the ground, including rigidly installing a series of posts the upper ends of which lie in a horizontal plane. Sheet material is applied to the ground beneath the structure to be erected to impede the growth of vegetation. On top of each of the posts is placed the tubular portion of a ground saddle. Two wooden joists are placed in each ground saddle to form a series of parallel beams. The beams are fastened in the ground saddles, and on top of the beams there is fastened a plurality of plane saddle devices. Within the plain saddle devices there is fastened a series of substantially parallel joists which are oriented perpendicular to the series of beams. The structural members are fastened on top of the joists to form the elevated structure.

1 Claim, 17 Drawing Figures

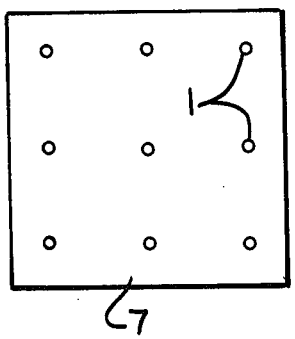
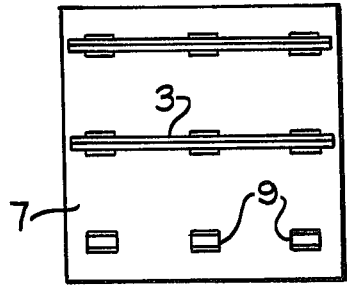
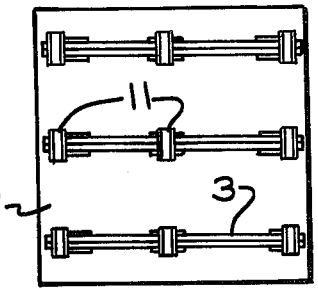
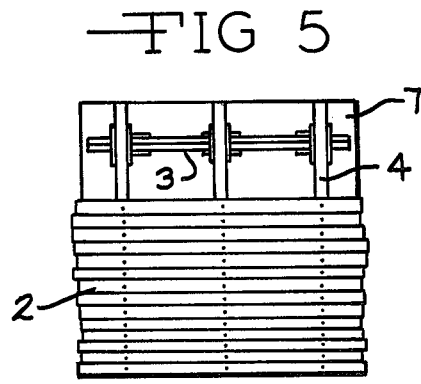
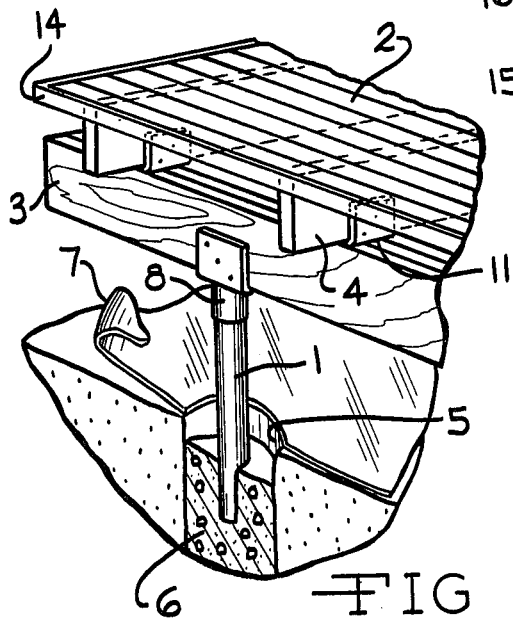
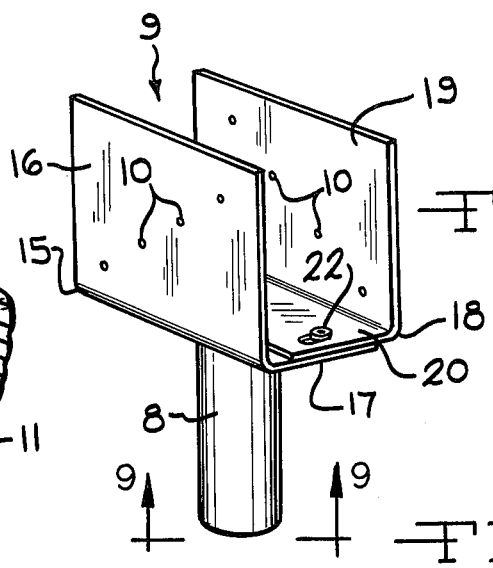
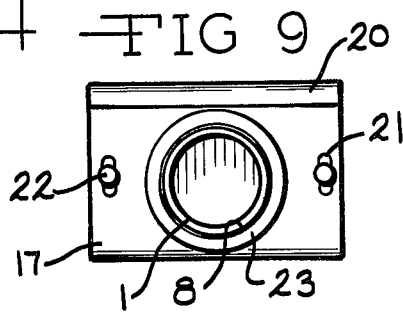

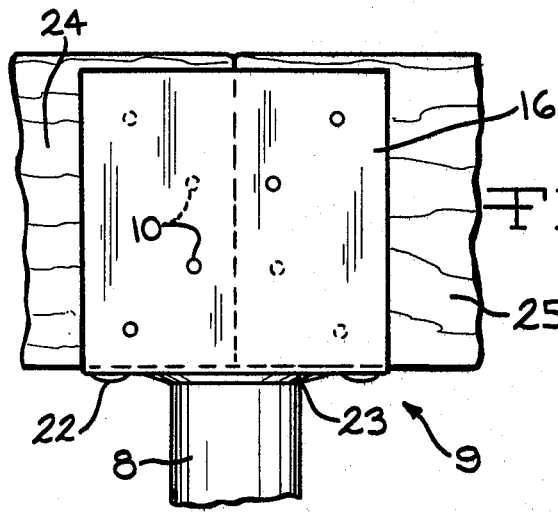
FIG. 10
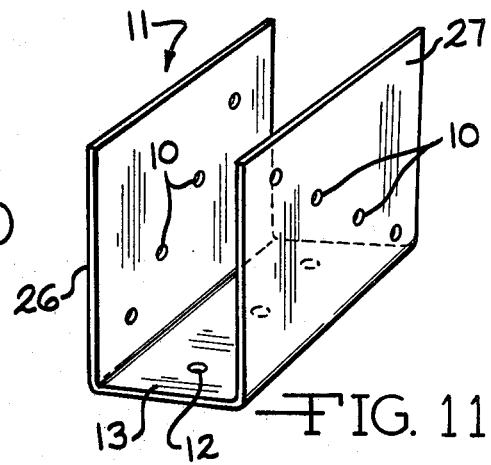
FIG. 11
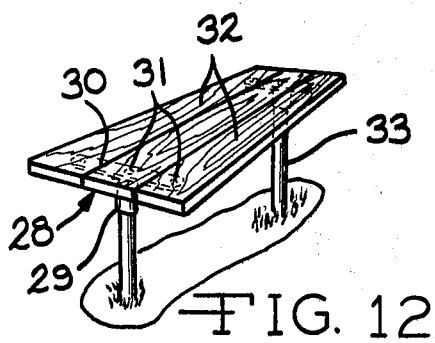
FIG. 12
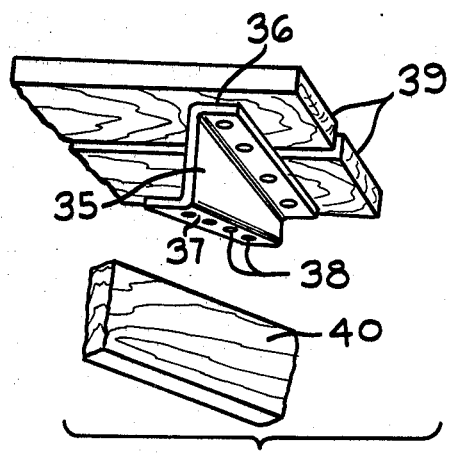
FIG. 13
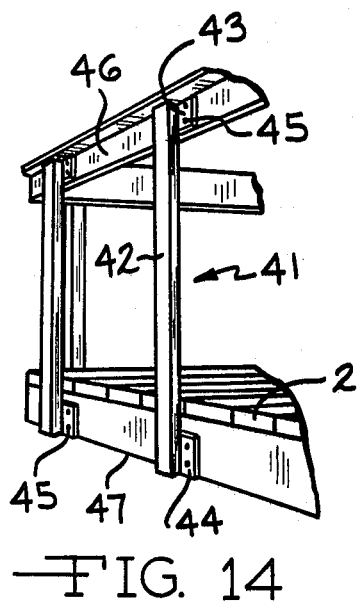
FIG. 14
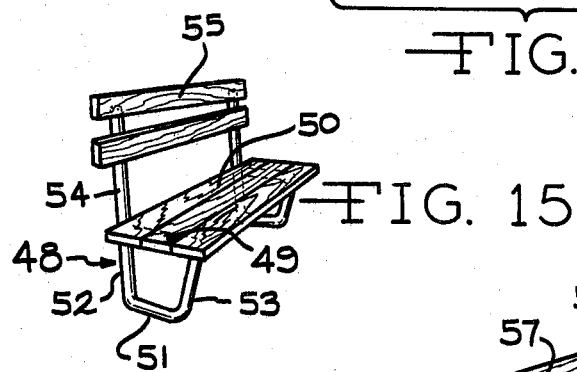
FIG. 15
FIG. 16
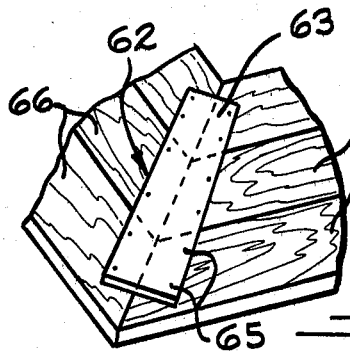
FIG. 17

SYSTEM AND APPARATUS FOR INTERCONNECTING STRUCTURAL MEMBERS, AND METHOD OF UTILIZING SAME

This is a continuation of application Ser. No. 372,698, filed June 22, 1973, which issued as U.S. Pat. No. 3,921,356 on Nov. 25, 1975.

The present invention relates to a method for facilitating the interconnection of a plurality of structural members, and to a method of utilizing such apparatus for erecting a structure elevated off of the ground. In particular, the present invention relates to a system, method and kit for building a wooden deck and various accessory structures, such as wooden steps and patio benches, and the necessary metallic components and brackets therefor.

BACKGROUND OF THE INVENTION

Heretofore, it was quite difficult for home owners to design or build a wood deck, because it was a major improvement to their home which required professional workmen, such as carpenters, concrete workers, etc. As a result, prior to the advent of the present invention, the construction of wood patios, decking, patio steps, and patio benches were relegated to the work of the architect and contractor. The present invention has changed this situation by putting into the hands of the non-handyman the necessary components, techniques, and information into a system or kit in order to build a strong deck structure and ancillary structures such as rail posts, benches and steps, as simply as possible. Some of the prior art components and techniques are discussed hereinafter.

O'Brien U.S. Pat. No. 737,133 entitled "ADJUSTABLE JOIST FOR SUPPORTING FIREPROOF FLOORS" discloses a yoke which is adapted to be threadedly supported on a central vertical support member. The yoke is adapted to hold two bars by means of a single bolt passing through a single aperture provided in each face plate of the yoke. In contrast to the present invention, such a yoke has no means for adjusting the distance between the face plates of the yoke to accomodate different sizes of bars or structural members, and such a yoke is not provided with a series of differently oriented apertures in each of the face plates thereof to avoid alignment of any apertures therein.

Ernst U.S. Pat. No. 1,013,004 entitled "POSTCAP" teaches a post cap comprising a socket portion having side and end walls which are adapted to embrace the end of a post, and a seat portion which rests upon and is secured to the socket portion. The side walls are provided with inwardly extending flanges which are adapted to engage the end of the post and lie between the end walls. The end walls have supporting flanges extending outwardly from the upper edges thereof. The inwardly and outwardly extending flanges lie in substantially the same plane and form a flat surface upon which the bottom of the seat portion rests. In contrast to the ground saddle of the present invention, this prior art post cap is not adjustable to accomodate various thicknesses of structural members to be supported thereby, and does not have any provision for rotation between the post socket and the seat portion.

Price U.S. Pat. No. 1,097,934 entitled "PRESSED-STEEL SILL-POCKET" discloses a device which facilitates extending one structural member at right angles to another structural member, with the end of one structural member abutting the other. Because this prior art device is concerned with a different problem solved by the present invention, it consequently has distinct and additional features not necessitated by the present invention. The Price sill pocket is formed from a single sheet of metal and comprises a flat rectangular seat, and a rear wall extending upwardly from the rear of the seat. Side walls at the sides of the seat extend to the rear of and beyond the rear wall and laterally extending attaching flanges integral with the side walls. Because the present invention is not concerned with abutting the end of one structural member at right angles to another structural member, the present invention requires no rear wall portion nor any attaching flanges. In addition, the Price sill pocket does not have opposed side portions provided with a series of differently oriented apertures wherein the apertures in one side portion are out of alignment with all of the apertures in the opposing side portion.

Carlson U.S. Pat. No. 1,532,729 entitled "SHRINKPROOF STUD SUPPORT" discloses a channel-like shoe having two depending solid pins rigidly affixed to the base thereof. In contrast to the present invention, the Carlson shoe is adapted to fit on the end of a wooden structural stud member, has no means for adjusting the distance between the side wall members of the shoe, and provides no rotational adjustment between its solid depending pins and the base of the shoe channel.

Daniels U.S. Pat. No. 1,657,253 entitled "JOIST AND RAFTER SUSPENSION BRACKET" teaches two different brackets, one of which is adapted to be affixed to a vertical upright wall post, and the other of which is adapted to be affixed to a horizontal ridge beam, but both of which are adapted to support spaced rafters which are obliquely oriented relative to the horizontal. In contrast, the plain saddle and ground saddle apparatuses of the present invention are adapted for supporting horizontally oriented structural members.

Taylor et al U.S. Pat. No. 1,720,104 entitled "BEAM HANGER" discloses a metal strap having spaced parallel depending arms with their free end portions directed outwardly at right angles to provide rests for beams or other structural members. The Taylor device requires an I-beam or other structural supporting beam in order to support it, and is not adapted to support one or more structural members which traverse the entire length of the beam hanger. In addition, the Taylor device does not have the ability to accomodate beams or structural members of different widths by adjustment of the device, as is the case with the present invention.

Clark U.S. Pat. No. 2,103,064 entitled "STUD TIE" relates to a means for tying building wall studs together where the plate capping the studs is cut out to pass heating or ventilating pipes or ducts. The stud tie is generally L-shaped in cross-section, except for two tongues which may be hammered into a position which is generally perpendicular to the main web of the stud tie. In contrast, the present invention provides an apparatus and a method wherein the structural members or beams are disposed between a pair of substantially parallel side members wherein the distance between the side members is adjustable to accomodate various widths of beams or structural members.

Earhart U.S. Pat. No. 3,188,696 entitled "COMBINATION ANCHORS AND BRACES" discloses a device having a bottom plate and side wall portions which are either longer than the bottom plate or which may be bent into an orientation which is perpendicular to the main side walls. In contrast, the present invention provides a method and an apparatus wherein the plain saddle apparatus has side portions which are the same width as the bottom plate portion, and is designed to accomodate and retain securely structural members which traverse completely the saddle apparatus or structural members which abut within the confines of the saddle apparatus the securement of which is facilitated by the oppositely oriented diagonal alignment of nail holes which prevent interference between nails from opposite sides, prevent splitting of the structural members, and assure retention of the structural members in their upper and lower portions.

The present invention eliminates the disadvantages attendant with the conventional and prior art techniques, and also provides a method and apparatus which will accomplish the necessary construction to be undertaken and provide an apparatus which has a permanent adjustable connection to accomodate different size lumber in its ground saddle apparatus embodiment.

SUMMARY OF THE INVENTION

The present invention provides an apparatus for facilitating the interconnection of a plurality of structural members, which comprises in combination a plurality of fastening means, and a plurality of structural members. The apparatus includes at least one surface thereof which is provided with apertures to facilitate the passage therethrough of at least some of the fastening means which serve to fasten the apparatus to one or more of the structural members.

The present invention also provides a method of utilizing the disclosed apparatus for erecting a structure which is elevated off of the ground, which method includes the step of rigidly installing a plurality of post members projecting out of the terrain in a predetermined pattern and in such a manner that the uppermost ends of the posts lie substantially within a plane which is oriented in a horizontal fashion. The method also includes the steps of applying to the ground beneath the elevated structure which is to be erected means for impeding the growth of vegetation, and placing on the top of each of the posts the tubular portion of a ground saddle apparatus. The method also includes the steps of placing within each of the ground saddles one or more structural members to form a series of substantially parallel beams, fastening such beams within the ground saddle apparatuses, and fastening at predetermined periodic spaced intervals on the top of such beams a plurality of plain saddle apparatuses. The method also includes the steps of placing one or more structural members within each of the plain saddle apparatuses to form a series of substantially parallel joists which are oriented substantially perpendicular to the series of beams, and fastening a layer of structural members on top of such joists to form the elevated structure.

BRIEF DESCRIPTION OF THE DRAWINGS

FIG. 1 illustrates a top plan view of the plastic sheeting and pipe layout for a patio deck to be constructed according to a first embodiment of the present invention.

FIG. 2 depicts a view similar to that of FIG. 1 but in an advanced stage of construction showing the installed ground saddles two rows of which are illustrated retaining main beams.

FIG. 3 illustrates a view similar to FIG. 2 but in an advanced stage of construction showing the plane saddles affixed on top of the main beams and oriented perpendicular to the main beams.

FIG. 4 illustrates a view similar to FIG. 3 but in an advanced stage of construction showing the joists nailed in the plain saddles.

FIG. 5 illustrates a view similar to FIG. 4 but in a further advanced stage of construction showing some of the decking members nailed on top of the joists.

FIG. 6 illustrates a view similar to FIG. 5 but in an advanced stage of construction showing the completed decking which has been trimmed and around the periphery of which has been affixed facia trim.

FIG. 7 depicts a perspective view, partly in section, of a portion of the patio deck illustrated in FIGS. 1 through 6 to elucidate the method and apparatuses according to a first embodiment of the present invention.

FIG. 8 illustrates a perspective view of a ground saddle according to one embodiment of the present invention. FIG. 9 depicts a bottom view of the ground saddle apparatus shown in FIG. 8.

FIG. 10 illustrates a partial elevational view of the ground saddle apparatus shown in FIG. 8 together with two abutting structural members which have been nailed together by use of the ground saddle apparatus.

FIG. 11 shows a perspective view of a plain saddle apparatus according to another embodiment of the present invention.

FIG. 12 depicts a perspective view of a garden bench embodying the novel garden bench brackets according to another embodiment of the present invention.

FIG. 13 illustrates a perspective view of a step bracket according to another embodiment of the present invention.

FIG. 14 illustrates a perspective view of rail posts according to another embodiment of the present invention.

FIG. 15 illustrates a perspective view of a bench provided with a seat back including the novel bench and back brackets according to another embodiment of the present invention.

FIG. 16 illustrates a perspective view of a bench including the novel patio bench brackets according to another embodiment of the present invention.

FIG. 17 illustrates a perspective view of the underside of a portion of a bench corner showing the novel bench corner plate according to another embodiment of the present invention.

Detailed Description of Some Embodiments of the Present Invention

With reference to FIGS. 1 through 9 and 11, there is illustrated the novel method and apparatus according to the present invention for erecting a structure, such as a patio deck, which is elevated off of the ground. As a first step in erecting the deck, the area where the deck is to be constructed should be staked out. It is preferable to tie string to the stakes at the desired level of the post members or pipe 1 which are illustrated in FIGS. 1 and 7. It is preferable to have the height of the pipe 1 between 13½ and 15½ inches below the height of the topmost finished deck members 2 which are illustrated in FIGS. 5, 6 and 7. A more exact measurement of the difference between the height of the pipe 1 and the height of the deck members 2 may be determined as a practical matter by stacking the lumber which will be disposed between the top of the pipe 1 and the deck members 2, viz., the main beams 3 and the joists 4, which are illustrated in FIGS. 2 through 5 and 7.

For the particular embodiment being described, the next step would be to dig post holes 5 approximately 8 inches in diameter. The depth of the hole 5 to be dug would depend on the frost line in the local where the deck is being erected, but it is pereferable to have 24 inches or more of the pipe 1 below the grade of the terrain. It is preferable to have the holes 5 dug so that the pipe 1 will be placed approximately 12 inches from each side of the finished deck, as illustrated in FIG. 1.

As part of the system and method according to the present invention of erecting the elevated structure or deck, there is the step of rigidly installing a plurality of post members or pipe 1 projecting out of the terrain in a predetermined pattern (such as the pipe pattern illustrated in FIG. 1) and in such a manner that the uppermost ends of the posts or pipe 1 lie substantially within a plane which is oriented in a horizontal fashion. To do this, the holes 5 should be filled with cement 6 with the top of the poured cement coming to about 4 to 5 inches below the ground level as shown in FIG. 7. The pipe 1 should be set in the cement 6 to the height needed which should be even with the string (not shown). The pipe 1 may, for example, be 1½ inch diamter cast iron pipe. The pipe 1 may, if desired, be cut after the cement 6 sets or hardens, if too long; or shimmed up, as much as two inches by using short pieces of pipe or washers, if too short.

The next step in the construction would be to apply to the ground beneath the elevated structure or deck which is to be erected, means for impeding the growth of vegetation. Such means may take various forms, such as a weed killer (not shown), sheet material 7 (shown in FIGS. 1 through 5 and 7), and/or crushed stone or wood chips over the sheet material 7. It is preferable to utilize all of the aforementioned means for impeding the growth of vegetation by first applying a weed killer to control the undergrowth, then spreading plastic sheeting 7, such as 4 mil. polyethylene, to match the periphery of the completed deck, and then spreading crushed stone or wood chips over the plastic sheeting 7.

The next step would be to place on top of each of the posts or pipe 1 the tubular portion 8 of a ground saddle apparatus 9, which step is illustrated best in FIGS. 2 and 7. The ground saddle apparatus 9 per se is described hereinbelow with particular reference to FIGS. 8, 9 and 10.

With particular reference to FIGS. 2 and 7, the next step would be to place within each of the ground saddles 9 one or more structural members to form a series of substantially parallel beams 3. The main beam 3 may be formed, for example, by nailing together two 2 by 6 inch boards to make the beams, and placing such beams 3 within the saddles 9.

The next step would be to fasten the beams 3 within the ground saddles 9, for example, by driving 1½ inch roofing nails through the holes 10 provided in the saddle 9 (see FIG. 8).

Referring to FIGS. 3 and 7, the next step would be to fasten at predetermined periodic spaced intervals on top of the beams 3 a plurality of plain saddle apparatuses 11, which are illustrated in FIG. 11 and described hereinafter in greater detail. Such fastening may be accomplished by driving nails or other fastening means through the holes 12 provided in the base plate 13 of the plain saddle 11 into the top of the main beams 3 (see FIG. 11).

With reference to FIGS. 4 and 7, the next step in the method would be to place the joists 4 within the plain saddles 11 so that the joists 4 are arranged substantially perpendicular to the main beams 3. The next step would be to fasten the joists 4 within the plain saddles 11 by driving nails through the holes 10 in the side portions of the plain saddles 11 (see FIG. 11).

With reference to FIGS. 5, 6 and 7, the next step would be to fasten a layer of structural members, such as 2 by 4 inch deck members 2, on top of the joists 4 to form the elevated structure. It is preferable to place the deck members 2 approximately one eighth of an inch apart, and to trim off the ends of the deck members 2 after the nailing is complete.

To finish off the deck, it is suggested to install facia trim 14 around the periphery of the deck.

FIGS. 8, 9 and 10 show in greater detail an embodiment of the invention in the form of a ground saddle apparatus 9 for facilitating the interconnection of a plurality of structrual members, such as main beams 3. The ground saddle apparatus 9 includes a first element 15 having a substantially L-shaped cross-section and including a first portion 16 and a second portion 17. The ground saddle apparatus 9 also includes a second element 18 having a substantially L-shaped cross-section and including a first portion 19 and a second portion 20.

The ground saddle apparatus 9 also includes adjustment means, such as slots 21 and rivets 22, adjustably interconnecting the first and second elements 15 and 18 to permit relative motion therebetween in order to accomodate various sizes of, widths of, or numbers of the structural members therebetween.

The first portion 16 of the first element 15 is provided with a plurality of apertures or holes 10 which are aligned in a first predetermined oblique direction relative to the orientation of second portions 17 and 20. The first portion 19 of the second element 18 is provided with a plurality of apertures or holes 10 which are aligned in a second predetermined direction which is disposed substantially perpendicular, on a projection basis, to the first predetermined direction.

The ground saddle apparatus 9 also includes a third element or tubular portion 8 which is substantially tubular in shape and which is rotatably interconnected to and affixed to one of the second portions 17 or 20 to permit rotational adjustment of the first and second elements 15 and 18 relative to the third tubular element 8. In the embodiment illustrated, the third tubular element 8 is rotatably interconnected to the second portion 17 of the first element 15. This rotatable connection is made by forming a circular opening in second portion 17, which opening is surrounded by a truncated conical flange 23 depending from the lower surface of second portion 17. In assembling the ground saddle 9, the upper portion of the tubular element 8 is inserted within the opening surrounded by the conical flange 23, and then the uppermost portion of tubular element 8 is flared out into an annular flange (not shown) which is disposed between the second portions 17 and 20 and is adapted to rotate therebetween together with its affixed tubular element 8. The rivets 22 are made to a suitable length to permit the rotation of the annular flange on the top portion of 8 to rotate between the second portions 17 and 20.

The rotatable feature of the ground saddle 9 is an important advantage of this embodiment in that it permits the first and second elements 15 and 18 to be rotated adjustably into any angular orientation relative to the longitudinal axis of the tubular element 8.

The adjustment means provided by slots 21 and rivets 22 permits the ground saddle 9 to snugly secure a single structural element of various widths, or a plurality of structural elements because of the adjustable sliding motion permitted by such adjustment means.

The alignment and positioning of the apertures or holes 10 is another advantageous feature of this embodiment. For example, when structural members, such as beams 3, are placed within the ground saddle 9 to traverse the entire length thereof, the fastening means, such as nails or screws, placed through the apertures 10 assure securement of the structural members in both the upper and lower portions thereof, and on both sides thereof, while at the same time minimizing and avoiding the occurrence of interference between fastening members driven from opposite sides of the apparatus and also inadvertent cracking of the structural members.

The alignment and positioning of the apertures 10 has additional significance when two different structural members, such as wooden members 24 and 25, are to abut within the confines of the ground saddle apparatus 9 (see FIG. 10). In this arrangement, it should be noted that the two lower holes 10 in first portion 16 together with appropriate fastening members passing therethrough assure the securement of the lower portion of structural member 24, while the two upper apertures 10 in first portion 19 together with appropriate fastening members passing therethrough assure the securement of the upper portion of structural member 24. Similarly, the two lower apertures 10 in first portion 19 together with appropriate fastening members passing therethrough assure the proper securement of the lower portion of structural member 25, while the two upper apertures 10 in first portion 16 with appropriate fastening members passing therethrough assure the proper securement of the uppoer portion of structural member 25 within the ground saddle 9.

With reference to FIG. 11, there is illustrated another embodiment of the present invention in the form of an apparatus, such as plain saddle apparatus 11, for facilitating the interconnection of a plurality of structural members. The plain saddle apparatus 11 includes a first side 26 provided with a series of apertures or holes 10 which are aligned in a first predetermined direction. The plain saddle apparatus 11 also includes a second side 27 which is disposed substantially parallel to the first side 26 and which is provided with a series of apertures or holes 10 which are aligned in a second predetermined direction which is disposed substantially perpendicular, on a projection basis, to the first predetermined direction.

The plain saddle apparatus 11 also includes a third side or base plate 13 which is unitary and integral with the first and second sides 26 and 27 and which interconnects and maintains in a spaced apart relationship the first and second sides 26 and 27. The third side or base plate 13 is provided with a plurality of apertures or holes 12 to facilitate the passage therethrough of at least some fastening means, such as nails, screws, bolts, etc.

It is to be noted that the plain saddle apparatus 11 has no feature for adjusting the distance between the sides 26 and 27, and lacks a tubular element 8 as shown in the ground saddle apparatus 9.

With reference to FIG. 12, there is shown another embodiment of the present invention in the form of garden bench brackets 28. Each garden bench bracket 28 includes a tubular element 29 centrally and integrally affixed to an elongated element 30. The elongated element 30 is provided with a plurality of apertures 31 to facilitate the passage therethrough of at least several of suitable fastening means (not shown), such as bolts, screws, nails, etc.

Each elongated element 30 is adapted to be disposed across a plurality of structural members 32, such as wooden boards, and to be fastened to said structural members 32 by means of the aforementioned fastening means. The tubular element 29 is adapted to fit over the top of a pipe-supporting member 33 projecting out of the ground terrain.

In a preferred embodiment of the garden bench bracket 28, the elongated element 30 is predrilled with the apertures 31 and dimensioned to accomodate three 2 by 6 inch boards 32 at the top. The tubular element 29 in the preferred embodiment is adapted to fit over a pipe-supporting member 33 in the form of standard 1 ½ inch black or galvanized pipe. It is preferred to have the pipe 33 set in an 8 inch diameter, 42 inch deep hole filled with concrete.

To give added strength to the elongated element 30, it is preferable to have an elongated element 30 which possesses a U-shaped cross section perpendicular to the longitudinal axis of the elongated element 30. Such a U-shaped cross sectioned elongated element 30 also facilitates the accommodation of fastening means which are passed through the apertures 31 from the bottom thereof and up into the structural members 32. In this fashion, the end of the fastening means terminates within the interior of the structural member 32 so that there is no interruption of the top surface of the structural member 32 upon which the user would sit.

With reference to FIG. 13, there is shown another embodiment of the present invention in the form of a step bracket 34. The step bracket 34 is provided with a main body portion 35 having integrally and unitarily connected thereto a first flange portion 36 and a second flange portion 37. The first and second flange portions 36 and 37, respectively, project from the main body portion 35 in opposite directions as shown in FIG. 13.

Each of the first and second flange portions 36 and 37 are provided with a plurality of apertures for facilitate the passage therethrough of at least some fastening means 38, such as screws, bolts, nails or the like, for affixing the step bracket apparatus 34 to a plurality of structural members. The first flange portion 36 has its longitudinal axis disposed in a predetermined acute angular relationship with the longitudinal axis of the second flange portion 37.

The first flange portion 36 is affixed to a plurality of structural members 39 which form a step tread. The second flange portion 37 is affixed to a structural member in the form of a stringer board 40.

The novel step bracket 34 permits the construction of steps in a ready manner and eliminates the necessity to cut risers and results in a stronger finished step.

With reference to FIG. 14, there is shown another embodiment of the present invention in the form of a novel rail post 41. The rail post 41 includes an elongated main post portion 42, a first end plate portion 43 centrally and integrally affixed at a first end of the main post portion 42, and a second end plate portion 44 centrally and integrally affixed to the main post portion 42 at the other end thereof. The first end plate portion 43 is provided with a series of apertures to facilitate the passage therethrough of some fastening means 45 for affixing the first end plate portion 43 to a structural member, such as top rail board 46. The second end plate portion 44 is provided with a plurality of apertures to facilitate the passage therethrough of fastening means 45 for fastening the second end plate portion 44 affixed to a structural member, such as board 47, which is fastened to the deck proper.

In a preferred embodiment of the rail post apparatus 41, the elongated main post portion 42 comprises a 30 inch long 1 inch by 1 inch steel tubing, and the first and second end plate portions 43 and 44 comprise 14 gauge steel plates which are pre-punched with holes to accomodate fastening means in the form of lag bolts.

With regard to FIG. 15, there is shown another embodiment of the present invention in the form of a bench and back bracket apparatus 48. The bench and back bracket apparatus 48 includes a first side member 49 which is provided with a series of apertures to facilitate the passage therethrough of fastening means for securing the first side member 49 to a plurality of structural members 50. The apparatus 48 also includes a second side member 51 which is disposed substantially parallel to the first side member 49 and which is also provided with a plurality of apertures for facilitating the passage therethrough of fastening means for securing the apparatus 48 to an external surface, such as a patio deck or the ground terrain. The bench and back bracket apparatus 48 also includes third and fourth non-parallel side members 52 and 53, respectively, which are integrally connected to the first and second side members 49 and 51 and which hold the first and second side members 49 and 51 in a predetermined spaced apart relationship.

The apparatus 48 also includes a fifth side member 54 which constitutes an extension of and is co-axial with the third side member 52, and which is integral and unitary with the second side member 51. The fifth side member 54 is provided in its portion remote from the second side member 51 with a plurality of apertures (not shown) to facilitate the passage therethrough of at least some fastening means, such as nails, bolts, screws, and the like, for securing the fifth side member 54 to other structural members, such as back rest boards 55.

In a preferred embodiment of the bench and back bracket 48, the bracket is predrilled for accommodating three 2 by 6 inch boards on the first side members 49 to serve as a bench seat, and two 2 by 4 inch boards 55 to serve as the back rest for the bench.

With reference to FIG. 16, there is illustrated a patio bench bracket apparatus 56 comprising a first side member 57 provided with a series of apertures to facilitate the passage therethrough of at least some fastening means for securing the first side member 57 to a plurality of structural members 58. A second side member 59 is disposed substantially parallel to the first side member 57, and is also provided with a plurality of apertures for facilitating the passage therethrough of some fastening means for securing the apparatus 56 to an external surface, such as the patio deck members 2 illustrated in FIGS. 5, 6 and 7. The apparatus 56 also includes third and fourth non-parallel side members 60 and 61, respectively, which are integrally connected to said first and second side members 57 and 59, and which hold said first and second side members 57 and 59 in a predetermined spaced apart relationship.

In a preferred embodiment of the patio bench bracket apparatus 56, the structural members making up the bracket apparatus 56 are made of heavy iron construction which are predrilled for easily mounting three 2 by 6 inch boards 58 to serve as the bench seat. The second side member 59 may be predrilled to bolt the apparatus 56 to a patio deck, a concrete surface, or any other suitable external surface.

In the apparatus 48 and 56 illustrated in FIGS. 15 and 16, the first side members 49 and 57, respectively, may be fabricated to have a generally U-shaped cross section for added strength and rigidity, and to accomodate the fastening means so that the fastening means are rigidly secured without emanating into or through the upper surface of the bench seats. Also, if desired, the bench and bracket apparatus 48 may have a first side member 49 which extends forwardly for a predetermined distance beyond the side member 53. Similarly, the patio bench bracket apparatus 56 shown in FIG. 16 may have its first side member 57 extending on both sides beyond the outer surfaces of third and fourth side members 60 and 61. These extensions increase the strength and rigidity of the structure, and facilitate the rigid securement of the seat boards or structural members.

With reference to FIG. 17, there is illustrated another embodiment of the present invention in the form of a bench corner plate apparatus 62. The bench corner plate apparatus 62 includes a substantially flat elongated plate 63 which is provided with a first series of apertures 64 on one side of the longitudinal axis of the plate 63, and a second series of apertures 65 being provided on the opposite side of the longitudinal axis of the plate 63. The bench corner plate apparatus 62 is used in conjunction with a first series of structural members 66 having their respective longitudinal axes disposed substantially parallel to each other. A second series of structural members 67 is employed having their respective longitudinal axes disposed substantially parallel to each other. The longitudinal axis of the first series of structural members 66 is disposed substantially coplanar with the longitudinal axis of the second series of structural members 67.

The edges of the first series of structural members 66 meet the edges of the second series of structural members 67 in a predetermined plane within which lies the longitudinal axis of the substantially flat plate member 63. The first series of apertures 64 on the first side of the longitudinal axis of the substantially flat plane member 63 serves to accommodate fastening means for fastening the plate member 63 to the first series of structural members 66. The second series of apertures 65 on the opposite side of the longitudinal axis of the substantially flate plate member 63 serves to accommodate fastening means for fastening the substantially flat plate member 63 to the second series of structural members 67.

The bench corner plate apparatus 62 may be readily employed when making an extension or an angular change in direction of a bench. Optionally, the bench corner plate apparatus 62 may be predrilled to work in conjunction with the embodiment of the invention illustrated in FIGS. 12, 15 and 16.

A very advantageous feature of the garden bench bracket apparatus 28 illustrated in FIG. 12 resides in the fact that the bench bracket apparatus 28 may be readily lifted off of the pipe or posts 29 for easy storage or refinishing, or for protection from the elements during inclimate meteorological seasons or conditions.

With reference to the apparatuses shown in FIGS. 15 and 16, it should be noted that an optional feature is to have the portions making up the apparatus with square or rectangular cross sectioned members for added rigidity and strength.

Adverting to FIG. 16, it has been found in practice preferable to have the members 59, 61 and 60 formed from a single unitary square-cross sectioned metallic tubing which is bent substantially into a generally U-shaped structure, upon the top of which is welded the member 57. Similarly, with reference to FIG. 15, it has been found preferable in practice to form the members 53, 51, 52 and 54 from a single unitary square-cross sectioned metallic tubing which is bent into the generally J-shaped structure, to which is welded the member 49.

With further reference to the bench corner plate apparatus 62 illustrated in FIG. 17, it should be noted that while this apparatus has found particular use in making a 90° change in direction of a bench, the apparatus 62 may be readily employed for any angular change and also for extending of a bench when the longitudinal axes of the structural members 66 and 67 are co-linear.

While there have been shown and described preferred forms and embodiments of the present invention, it is to be understood that the invention is not necessarily confined thereto, and that any change or changes in the structures of and in the relative arrangements of components thereof are contemplated as being within the scope of the invention as defined by the claims appended hereto.

I claim:

1. An apparatus for facilitating the interconnection of a plurality of structural members, comprising, in combination:
   a plurality of fastening means;
   a plurality of said structural members;
   and said apparatus includes:
   at least one surface of said apparatus is provided with apertures to facilitate the passage therethrough of at least some of said fastening means which serve to fasten said apparatus to at least one of said structural members;
   a first side provided with a series of said apertures which are aligned in a first predetermined direction;
   a second side which is disposed substantially parallel to said first side and which is provided with a series of said apertures which are aligned in a second predetermined direction which is disposed substantially perpendicular to said first predetermined direction;
   a third side which is unitary and integral with said first and second sides and which interconnects and maintains in a spaced apart relationship said first and second sides; and
   said third side being provided with a plurality of said apertures to facilitate the passage therethrough of at least some of said fastening means.

* * * * *